United States Patent [19]

Steinberg et al.

[11] 3,856,054

[45] Dec. 24, 1974

[54] GLASS POLYMER COMPOSITES

[75] Inventors: Meyer Steinberg, Huntington Station; Peter Colombo, Patchogue; Gerald Farber, Elmont, all of N.Y.

[73] Assignee: The United States of America as represented by the United States Atomic Energy Commission, Washington, D.C.

[22] Filed: July 28, 1972

[21] Appl. No.: 276,211

[52] U.S. Cl.............. 138/174, 138/177, 161/7, 161/168, 264/71, 264/128, 264/214, 264/216, 264/347, 260/42.53
[51] Int. Cl............................ F16l 9/00, B28b 1/08
[58] Field of Search........ 161/168; 264/69, 71, 128, 264/109, 214, 216, 347; 138/174, DIG. 7, 177

[56] References Cited
UNITED STATES PATENTS

| | | | |
|---|---|---|---|
| 1,563,584 | 12/1925 | O'Shaughnessy | 161/168 X |
| 2,553,759 | 5/1951 | Geiger | 161/168 |
| 2,899,402 | 8/1959 | Squire | 260/41 AG |
| 3,056,704 | 10/1962 | Rothweiler et al. | 264/128 X |
| 3,281,515 | 10/1966 | Schmitz | 264/347 X |
| 3,290,426 | 12/1966 | Barrentine | 138/DIG. 7 |
| 3,549,509 | 12/1970 | Casalina | 264/128 X |
| 3,567,496 | 3/1971 | Steinberg et al. | 117/113 |
| 3,607,511 | 9/1971 | Grosh | 138/174 X |

*Primary Examiner*—George F. Lesmes
*Assistant Examiner*—Paul J. Thibodeau
*Attorney, Agent, or Firm*—John A. Horan; Leonard Belkin

[57] ABSTRACT

A glass polymer composite and a method of preparing same consisting of crushed glass with a mixture of sizes to obtain minimum void volume impregnated with monomer which is polymerized in situ. Certain construction materials such as sewer pipe and exterior wall facings made from this material are illustrative.

4 Claims, No Drawings

GLASS POLYMER COMPOSITES

BACKGROUND OF THE INVENTION

The invention described herein was made in the course of, or under a contract with the U.S. Atomic Energy Commission.

The disposal of waste products in this country and elsewhere has developed during the past generation into a problem of major proportions, caused in great part by expanding population, continued and rapid urbanization with resulting greater concentrations of the existing population, and concern with the effects of these trends on the environment.

One consequence of these recent trends is the expansion in the use of underground sewage systems, either to replace individual home and commercial cesspools or to transfer liquid wastes to sewage treatment plants. In a typical sewage system, the sewer pipe is made from concrete. Concrete is normally quite porous, and a severe problem in the use of ordinary concrete for sewer pipe is that under aerobic conditions the hydrogen sulfide emitted from the sewage in sewer lines becomes oxidized to sulfuric acid which severely attacks the concrete. As a result, the concrete sewer pipe lines must at times be replaced at a high cost of labor and material and at a great convenience.

Another facet of the general problem of waste disposal has to do with solid wastes. Typically, a municipality disposes of its solid waste products by establishing land fill areas where these materials are dumped and covered over. In a typical town of 200,000 people it is estimated that about 500 tons of solid waste are collected daily. Incinerators may be employed to concentrate the waste somewhat, and the residue, which includes broken glass from bottles, tin cans, etc., is then placed in landfill areas. The presence of glass in the solid raw waste requires that incinerators be operated less efficiently at low temperatures as the presence of glass at the higher more efficient temperatures may cause fusion on the grates and plug up the furnaces. Furthermore, landfill areas in a typical site on Long Island, New York, are now running at about $25,000 per acre, the sheer totals of waste to be disposed of requiring increasing amounts of such land areas which are becoming more scarce near the most urban areas.

SUMMARY OF THE INVENTION

It has been found that an improved sewer pipe and similar articles of construction which are corrosion resistant can be manufactured from the waste glass products commonly found in the solid wastes of a typical municipal sewage system. The waste glass, which is in particulate form, is bonded with a plastic polymer prepared in situ. Recycling of glass products from the waste makes it possible to operate incinerators more efficiently at higher temperatures and to reduce landfill requirements while at the same time an otherwise waste product is made useful.

In accordance with a preferred embodiment of this invention the highly corrosion resistant material having suitable physical characteristics for use in manufacturing sewer pipe is prepared by first crushing glass collected and separated from solid wastes. Then the glass, which is derived from broken bottles and the like and which may even include the bottle caps and the paper labels, may be graded after crushing by sieving in sizes such that when the sizes are mixed together a minimum void volume is obtained. The crushed and graded glass is poured into a form shaped into that of the final product and is then impregnated by monomer which contains a suitable additive, agitated to remove entrapped air, and then in situ polymerized. Heat may be applied to promote the polymerization.

In another embodiment of this invention there is provided a sewer pipe and the like comprising crushed glass in a variety of particulate sizes in suitable proportions to minimize void volume and filled with an in situ polymerized resin.

It is thus a principal object of this invention to provide an improved sewer pipe of corrosion resistant material prepared from recycled waste glass.

Other objects and advantages of this invention will become obvious from the following description of preferred embodiments of this invention.

DESCRIPTION OF PREFERRED EMBODIMENTS

In accordance with a preferred embodiment of this invention, bottles (i.e., non-returnables) and other glassware found in the solid waste of municipalities are separated from the other waste products and then crushed. Crushing may be accomplished by first loading the glassware into a cement mixer and tumbling with a low volume water flow. The water present has the advantage of removing much of the labels and similar extraneous material. It also keeps the silica dust down to zero. This first stage crushing gives glass pieces that range of 2 inches × 2 inches to fine sand sizes, but mostly (approximately 90 percent) the larger size. This glass is then fed into a high speed rotary crusher with tungsten blades to break the aggregate down to usable sieve sizes. Again water is used, to avoid excessive dust.

The glass is then put on trays and may be dried in an oven or air dried, after which it is sieved to proper aggregate size. This part of the procedure must be done dry and in a hood. The final sieved and segregated sizes are as follows: coarse — 60.7 percent 0.03 inch–.4 inch; medium — 23.0 percent 0.01 inch–0.03 inch; and fine — 16.3 percent .002 inch–.01 inch.

A mixture of the coarse, medium, and fine aggregate, as defined above for the purposes of this invention, of the glass is then prepared in suitable proportions such that the void volume of the mixture is less than 20 percent. A typical such mixture is about (by weight) 60 percent coarse, 25 percent medium, and the remainder fine aggregate.

The glass mixture is poured into a mold which can be prepared from mild steel sheet. For preparing sewer pipe, two concentric cylinders of the required diameters are assembled and soft soldered along the seams and to a flat steel plate at the bottom. Soft solder provides a completely tight container but is weak enough to break open and release the finished pipe. A mild release agent, such as polyvinyl alcohol, coating the steel, may be employed to facilitate removal, or a polyethylene or mylar coating may be used. Two entrance tubes through the bottom plate may be used to bring in the monomer. Tapping of the cylinders as the glass aggregate is poured into the mold insures settling of the aggregate.

Monomer with suitable additive may be applied to the mold from a raised tank connected by pipes to the bottom openings into the mold. In this way the monomer fills from the bottom up thereby driving out the air during filling, or, if desired, monomer may be filled from the top. After monomer loading is complete, the mold is vibrated to release any entrapped air and also to prevent segregation. Monomer loading is up to 10 percent by weight corresponding to the 20% void volume.

Curing may be done by blowing hot air along the inner and/or outer walls of the mold if a catalyst is employed as the additive. By this method, the temperature is easily controlled. This system works well with any sewer pipe diameter or length without having to use an oven. The cure is considered complete after the sewer pipe is kept at 65°C. for about 12 hours, although shorter periods may prove adequate. During the exothermic reaction, temperature is controlled by pumping room temperature air. With the use of a promoter in addition to the catalyst, cure may be accomplished at room temperature as is understood in the art.

Any commercially available monomer containing a suitable catalyst or/and promoter may be used which can be thermally or chemically initiated to polymerize. A suitable mixture for this use was found to be methyl methacrylate (MMA) containing 1 percent azobisisobutyronitrile (AIBN) catalyst with the application of heat. For room temperature polymerization a useful catalyst and promoter would be methyl ethyl ketone peroxide and cobalt naphthenate, respectively. A small amount of a bonding agent for the organic-inorganic materials, such as 1% gamma-methacryloxypropyltrimethoxy silane, which is well known in the art, may also be included. Other possible polymerizable materials are given in U.S. Pat. No. 3,567,496, namely, styrene, methyl methacrylate, acrylonitrile, isobornyl methacrylate, or trimethylolpropane trimethacrylate.

EXAMPLE 1

Glass aggregate was prepared from glass bottles taken from the solid waste of the Town of Oyster Bay, Long Island, Collecting Depot. After crushing in the manner previously described, the steel mold was filled with an aggregate consisting of 60.7 percent coarse, 23.0 percent medium, and 16.3 percent fine. The monomer consisted of MMA plus 1 percent AIBN and 1 percent silane. Curing was accomplished as described. The finished pipe had an I.D. of 8 inches, a wall thickness of 0.75 inch, a length of 25 inches and weight of 36 lbs. A three point crushing test gave a value of 2,800 lbs./ft. length of pipe.

EXAMPLE 2

Laboratory glass bottles were crushed by pounding in a large steel cylinder with a steel rod. This glass was then sieved through standard (U.S. sieve) screening to give a low void volume mix. The proportions were as follows:

⅜ inch to ½ inch 60.7 percent (by weight)
20–30 mesh 23.0 percent
40–60 mesh 10.2 percent
170–270 mesh 6.1 percent After weighing out enough for a glass test cylinder the aggregate was mixed in a laboratory dry blender for 10 minutes. Loading the dry mix was accomplished with a vibrating conveyor and fed into a glass tube that had previously been coated on the inside with a mold release agent. The loading tube was 1.7 inch I.D. and approximately 5 inches long Pyrex glass that had an entrance port for the monomer at the bottom. Monomer used was MMA with 1 percent benzoyl peroxide catalyst and 1 percent silane. Filling the cylinder loaded with dry mix was done by bringing the monomer in the bottom to displace the air out the open top. The sample was vibrated after being filled with monomer, to compact it, and drive out any air bubbles that may have been trapped. Curing was accomplished by heating at 75° C. overnight. Monomer loading for the sample was 7.0 percent corresponding to an aggregate void volume of about 14 percent. Compression strength after the ends of the cylinder were cut square and capped was 13,500 psi.

It has been found that for best results including best cost efficiency, the glass aggregate should have a size mix to give minimum void volume. Based upon practical considerations, this requires void volume of not more than 20 percent. Monomer loading would thus be not more than 10 percent by weight. The composite material made in this way contains approximately 90–95 percent glass and 5 to 10 percent polymer. The compressive strength of a typical glass-polymer composite made in accordance with this invention has been measured to be about 16,000 psi and tensile strength up to about 1,200 psi which is more than three times stronger than conventional concrete used for sewer pipe. Water absorption is reduced by 95 percent from the concrete and the material is found to be inert to less than 5 percent sulfuric acid solution.

A preliminary evaluation of the economics shows that the glass-containing sewer pipe made in accordance with this invention may be competitive with conventional concrete sewer pipe. The glass-polymer composite made in accordance with the invention has a density of about 120 lb./ft.$^3$, compared to 150 lb./ft.$^3$ for concrete, and its higher strength may permit thinner walls. As an example, assume an 8 inch I.D. pipe and three possible wall thicknesses of ⅜ inch, ½ inch, and ¾ inch. The table below gives the unit weights per ft., and the estimated material cost and fabrication cost of sewer pipe for these different wall thicknesses.

Table

Economics of glass-polymer composite pipe - 8″ I.D.

| O.D. | Wall | Wt.-lb./ft. | Cost-cents/foot | | |
|---|---|---|---|---|---|
| | | | Materials | Fabrication | Total |
| 8 ¾″ | ⅜″ | 7.55 | 11 | 11 | 22 |
| 9″ | ½″ | 10.3 | 15 | 15 | 30 |
| 9 ½″ | ¾″ | 16.9 | 24 | 24 | 48 |

These economics are based upon the assumption that the glass has no value, which may very well be true for mixed cullet. In fact, it may even have a negative value since it does not require landfilling or incineration. Also, assuming a nominal composition of 93 percent glass — 7 percent methyl methacrylate monomer, the only material cost is that of the monomer at 20cts./lb. or 1.4cts./lb. for the pipe. Doubling this cost for the fabrication of the pipe, one arrives at the final manufactured cost. At most, this cost will probably vary by no more than 1ct./lb. either way. The final cost is thus about 2.8cts./lb. The cost expressed on a per ft. basis, from 22 to 48cts. per ft., depending on wall thickness.

In comparison, 8 inch I.D. ASTM C-14 Sewer Pipe, of unreinforced concrete, has a minimum wall thickness of ¾ inch and costs about 2cts./lb., resulting in a cost of 42cts./ft. This roughly demonstrates that, at the same wall thickness, glass-polymer composite pipe is competitive at 48cts./ft.; if thinner walls prove to offer strengths equivalent to that of concrete, the cost could drop to 22cts./ft. or less based upon the foregoing analysis.

As the finished surface of the material prepared in accordance with the principles of this invention has been found to have a pleasing appearance as well as being resistant to certain chemical effects, other articles of construction, such as exterior wall facings, can suitably be prepared in accordance with this invention. Also, it is understood that many variations are possible without departing from the principles of this invention. For example, an an alternative to adding monomer to the glass aggregate in the form, the monomer and glass may be pre-mixed, or the glass added to the liquid monomer in the form.

What is claimed is:

1. The method of preparing a material useful for construction comprising the steps of:
   a. crushing glass bottles and the like;
   b. formulating a mixture of coarse, medium and fine aggregate having a void volume not in excess of 20 percent;
   c. forming said mixture and a monomer selected from the group consisting of styrene, methyl methacrylate, acrylonitrile, isobornyl methacrylate, and trimethylolpropane trimethacrylate with additive into the desired shape;
   d. vibrating the mixture containing monomer to eliminate trapped air; and
   e. causing in situ polymerization of said monomer.

2. The method of claim 1 in which the mixture is formulated of about 60 percent by weight of coarse aggregate, about 25 percent by weight of medium aggregate, and the remainder fine aggregate.

3. The method of manufacturing a sewer pipe comprising the steps of:
   a. crushing glass bottles and the like;
   b. formulating a mixture of coarse, medium and fine aggregate in which the void volume is not in excess of 20 percent;
   c. pouring the mixed glass into a form including a pair of concentrically arranged cylindrical forms;
   d. impregnating the mixed glass with a monomer selected from the group consisting of styrene, methyl methacrylate, acrylonitrile, isobornyl methacrylate, and trimethylolpropane trimethacrylate containing a chemical catalyst;
   e. vibrating the mixture impregnated with monomer to eliminate trapped air; and
   f. blowing warm air along the walls of said forms to maintain a proper elevated temperature for a sufficient length of time to cause in situ polymerization.

4. A sewer pipe comprising an aggregate of coarse, medium and finely crushed glass, said aggregate having a void volume of less than 20 percent and impregnated with up to about 10% by weight polymer prepared in situ, said coarse aggregate being present by weight in about 60%, the medium aggregate in about 25 percent, and the remaining aggregate being fine.

* * * * *